Oct. 30, 1951  J. B. WELCH  2,573,124
SAFETY CONTROL FOR ROCKER-ARM WELDERS
Filed May 3, 1950
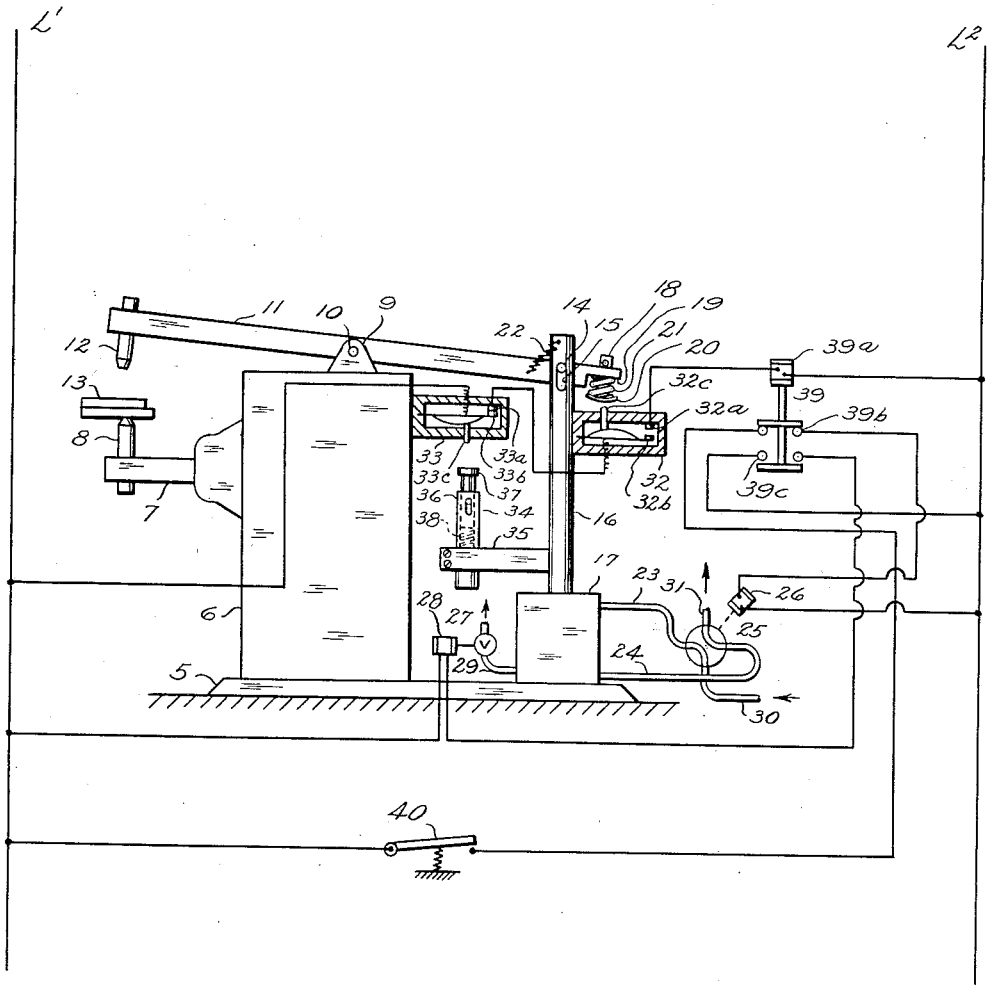
INVENTOR.
Jerome B. Welch.
BY W. E. Lyon
ATTORNEY.

Patented Oct. 30, 1951

2,573,124

UNITED STATES PATENT OFFICE 2,573,124

SAFETY CONTROL FOR ROCKER-ARM WELDERS

Jerome B. Welch, Wauwatosa, Wis., assignor to Cutler-Hammer, Inc., Milwaukee, Wis., a corporation of Delaware Application May 3, 1950, Serial No. 159,694

7 Claims. (Cl. 219—4)

This invention relates to safety control for rocker-arm type welders.

In my Patent No. 2,494,847, issued January 17, 1950, there is disclosed a safety control system for powered welders which is particularly adaptable to welders of the ram type. The safety control herein disclosed is in certain respects similar to that disclosed in the aforementioned patent.

The object of the present invention is to provide for powered welders of the rocker-arm type control sensitive to obstruction between the movable electrode and the work and responsive to move the movable electrode away from the work when an obstruction is encountered, while permitting normal operation of the welder under normal conditions.

Other objects and advantages of the invention will hereinafter appear.

The accompanying drawing illustrates a preferred embodiment of the invention which will now be described, it being understood that the embodiment illustrated is susceptible of various modifications without departing from the scope of the appended claims.

The single figure of the drawing depicts more or less schematically a fluid powdered welder of the rocker-arm type together with a control system therefor.

Referring to the drawing, it shows a rocker-arm type welder provided with a base 5 and a combined housing and vertical support 6. A horizontal extending support 7 rigidly secured to the front side of the housing 6 provides for securement and support therein, in any preferred manner, of a stationary welding electrode 8. A bearing bracket 9 secured to the top of the support 6 is provided with a suitable clearance opening to accommodate a pivot shaft 10. Shaft 10 affords pivotal bearing support for a movable carrier 11 and may be assumed to be supported adjacent its other end within another bearing bracket, not shown, which is like the bracket 9. Carrier 11 may thus be assumed to be freely movable about the shaft 10 and constrained against any substantial lateral movement by said bearing brackets. A welding electrode 12 is secured within the carrier 11 adjacent the end of the latter overlying support 6 in any preferred manner, and upon pivotal anticlockwise movement of carrier 11, electrode 12 is adapted to be brought into welding relation with the electrode 8 on the work 13. Adjacent its other end, carrier 11 is provided with a pin 14 rigidly secured to and extending from a side thereof. Pin 14 is accommodated within and projects through an elongated opening or slot 15 formed in a member 16. Member 16 at its lower end is rigidly attached to a piston (not shown), which is adapted to move within the cylinder 17 by application of air or fluid power to its opposite ends, and member 16 is thereby afforded rectilinear movement in reverse directions. Between the other end of carrier 11 and the pin 14, the carrier is reduced in vertical dimension to provide a reduced end portion. The reduced end portion is provided with a vertical clearance opening to freely accommodate the stem portion 18 of a switch actuator 19 which is preferably provided with a substantially spherical segment shaped end portion 20. Actuator 19 is biased downwardly in extended relation by a coiled compression spring 21 which bears at one end against the carrier 11 and its other end against the inner side of portion 20. Stem 18 of actuator 19 is drilled transversely above the upper side of carrier 11 to accommodate a cotter-key or the like to limit the extent of downward movement of stem 18 under the bias of the spring 21. A tension spring 22 may be optionally attached at one end to member 16 and at its other end it is secured to the carrier 11.

As will be later more fully explained, the pin and slot connection between carrier 11 and member 16, afforded by pin 14 and the slot 15 aforedescribed, provides a lost motion driving connection which facilitates the use of the control system now to be described.

The movement of member 16 upwardly and downwardly is effected by the application of air or other fluid under pressure to the upper and lower ends of the aforementioned piston in cylinder 17 through the conduits 23 and 24. The means for controlling the admission and release of air from said opposite ends of said piston comprise a well known form of multi-way valve 25 having an electromagnetic operating winding 26, and an auxiliary exhaust valve 27 having an electromagnetic operating winding 28, interposed in an exhaust conduit 29 which connects interiorly with cylinder 17 below the lower side of said piston. In conformity with general practice, valve 25 is biased to the position shown when its operating winding 26 is deenergized thereby affording connection of conduit 23 through said valve with an air supply conduit 30 and connection of conduit 24 with an exhaust conduit 31. The exhaust valve 27 is closed when its operating winding 28 is deenergized and is opened by energization of said operating winding. In the normal position of valve 25 the piston will be forced to its lower extreme position within cylinder 17 so that the member 16, carrier 11 and other parts associated with said carrier will be in the positions shown in the drawing.

An electric switch 32, which in one preferred form is a sensitive snap action switch of the so-called "Micro" type, is secured in any preferred manner to member 16. Switch 32 is provided with a stationary contact 32ª, a movable contact 32ᵇ which is normally disengaged from contact 32ª, and an actuator 32ᶜ, which when moved inwardly of the switch effects, with snap action, engagement of contact 32ᵇ with contact 32ª. As will be later more fully explained, under certain conditions actuator 32ᶜ of switch 32 is adapted to be moved inwardly by engagement with the end portion 20 of switch actuator 19.

An electric switch 33, which is preferably of the same type as switch 32, is secured in any preferred manner to the rear end of support 6. Swithch 33 is provided with a stationary contact 33ª, a movable contact 33ᵇ which is normally engaged with contact 33ª, and an actuator 33ᶜ, which when moved inwardly of the switch, effects with snap action disengagement of contact 23ᵇ from contact 33ª.

A switch actuator 34, adjustably supported in an arm 35 rigidly attached to member 16, is adapted to effect operation of switch 33 upon upward movement of member 16. Actuator 34 in a preferred embodiment is provided with a casing 36 within which is mounted in telescopic relation an operating member 37 which is normally urged in extended relation by a compression spring 38 with respect to the casing 36. As member 16 moves upwardly, member 37 of actuator 34 ultimately engages actuator 33ᶜ of switch 33 to effect actuation of the latter. Further upward movement of member 16 causes relative movement between member 37 and casing 36 of device 34 thereby affording over-travel protection for switch 33. It may be assumed that the arm 35 is suitably formed and provided with frictional clamping means as will enable actuator 34 to be adjustably clamped therein so that the spacing between the upper end of member 37 and the lower end of actuator 33ᶜ of switch 33 may be adjusted.

The contact 33ᵇ of switch 33 is connected to power supply line L¹ and the contact 33ª of said switch is connected to contact 32ᵇ of switch 32. Contact 32ª of switch 32 is connected to supply line L² through an electromagnetic operating winding 39ª of a relay 39. A normally open switch 40, which in practice is preferably of the foot-operated type, is connected across supply lines L¹ and L² in series with normally engaged contacts 39ᵇ of relay 39 and operating winding 26 of valve 25. Relay 39 is also provided with normally disengaged contacts 39ᶜ which when engaged connects winding 28 of auxiliary exhaust valve 27 across supply lines L¹ and L².

The operation of the welder will now be described.

Operation of the welder is initiated by closure of switch 40. Winding 26 of valve 25 is thereby energized and the latter assumes an operating position such that air under pressure will flow from conduit 30 through valve 25, conduit 24, into cylinder 17 on the lower side of the piston, and air in cylinder 17 above the piston will be exhausted through conduit 23, valve 25 and conduit 31. As a result, member 16 moves upwardly. If the inherent bias or turning moment of carrier 11 inclusive of electrode 12 to the left of pivot shaft 10 is sufficiently great, which is often true of many rocker-arm welders, carrier 11 will move about pivot shaft 10 anticlockwise just as fast as the member 16 moves upwardly, thereby maintaining pin 14 engaged with member 16 at the upper end of slot 15. In the event that carrier 11 will not inherently turn anticlockwise fast enough to maintain such engagement between pin 14 and member 16, it will be insured by the tension spring 22 which resists relative movement between carrier 11 and member 16. In some instances the spring 22 may be dispensed with if desired.

Assuming that there is no obstruction between the electrode 12 and work piece 13, carrier 11 will move anticlockwise just as fast as it is permitted to do so by member 16. Assuming that switch actuator 34 has been positioned in support 35 so that member 37 is in properly spaced relation to the lower end of actuator 33ᶜ of switch 33 when member 16 is in its lower extreme position shown in the drawing, member 37 will then engage actuator 33ᶜ to effect actuation of switch 33 just as, or slightly before, electrode 12 engages with the work 13. After electrode 12 has engaged the work 13, further movement of carrier 11 will be momentarily arrested, and member 16 will then move with lost motion relative to carrier 11 (against the tension of spring 22 if used) until the lower end of slot 15 engages with pin 14 of carrier 11. Upon take-up of the lost motion between member 16 and carrier 11, electrode 12 will then be clamped against the upper side of work piece 13 under pressure imparted through member 16. Thereafter, it may be assumed that the welding electrodes 8 and 12 are suitably energized through an energizing circuit of any preferred type upon development of a predetermined degree of pressure of such electrodes against the work; the energizing means for electrodes 8 and 12 forming no part of the present invention.

After completion of the welding of work 13, the return of the welder to its normal position is effected by release of switch 40. Release of switch 40 causes winding 26 of valve 25 to be deenergized and the latter will assume its normal operating position and air under pressure will be admitted to cylinder 17 on the upper side of the piston and air will be exhausted from the cylinder on the lower side of the piston. Consequently, member 16 will initially move downwardly with lost motion with respect to carrier 11 until the upper end of slot 15 engages with pin 14 on carrier 11. Upon take-up of the lost motion between member 16 and carrier 11, the latter will then be pivotally moved in the clockwise direction by member 16 until said member and said carrier return to their normal positions shown in the drawing.

As will now be described, the control system inherently functions in a manner to prevent injury to the operator. Assume that during operation of the welder to move electrode 12 downwardly toward the work, the operator negligently places his hand over the work in line with electrode 12. When the tip of electrode 12 comes into contact with the operator's hand, movement of carrier 11 in the anticlockwise direction is arrested with the result that member 16 then moves upwardly with lost motion relative to carrier 11. Upon a slight degree of such lost motion movement, actuator 32ᶜ of switch 32 engages with the end portion 20 of actuator 19 and is moved inwardly of switch 32 to effect engagement of contact 32ᵇ with contact 32ª. Actuation of switch 32 thereby completes a circuit from line L¹, through switches 33 and 32, energizing winding 39ᵃ of relay 39 to line L². Consequently, relay 39 functions to open its contacts 39ᵇ and close its contacts 39ᶜ. As a result, winding 26 of valve 25 is deenergized, which as aforedescribed, causes valve 25 to assume its normal position affording exhausting of air from the lower side of the piston and application of air to the upper side of the piston. Simultaneously therewith, the winding 28 of exhaust valve 27 is energized to afford supplemental exhaustion of air from the lower end of the piston. Member 16 is thereby caused to move rapidly in the downward direction and after take-up of the lost motion between it and carrier 11, the latter is caused to be moved clockwise rapidly with the result that electrode 12 is moved rapidly away from the operator's hand, before any appreciable pressure is exerted thereon, thereby preventing injury to the operator.

It will be appreciated that the safety function of the control system will be afforded so long as the switch 33 is not actuated prior to actuation of switch 32. To insure that such safety functions will be afforded up until the time the electrode 12 contacts or closely approaches the work, it is required that care be exercised in setting the position of actuator 34 in the support 35 to insure that switch 33 will not be operated appreciably in advance thereof.

In normal operation of the welder where no obstruction is encountered, the switch 33 will be actuated before switch 32 is actuated, thereby rendering the safety function inoperative. Switch 32 even during such normal operation will be actuated as a result of take-up of lost motion between member 16 and carrier 11 and the resiliently mounted actuator 19 affords over-travel protection for this switch.

Auxiliary exhaust valve 27 and the parts associated therewith, including the contacts 39ᶜ of relay 39, may be omitted as desired if valve 25 is of such character that it will provide for exhaustion of air or other fluid at a rapid rate. The use of auxiliary valve 27 insures that there will be rapid exhaustion of air or fluid from the lower side of the piston when a foreign object is encountered by electrode 12 in moving downwardly toward the work.

I claim:

1. In a powered electric welder, in combination, a pair of relatively movable welding electrodes, a carrier pivotally movable in reverse directions to move one of said electrodes toward or away from the other electrode, a rectilinearly movable member having a lost motion driving connection with said carrier, and which upon movement in one direction effects movement of said carrier to separate said electrodes, power responsive means affording movement of said member in said one direction to a normal extreme position or in the opposite direction toward another extreme position, said carrier having bias maintaining take-up of lost motion between it and said member upon movement of the latter from its normal extreme position toward its other extreme position until the carrier electrode contacts the work between said electrodes or is arrested before it contacts the work, and control means for said power responsive means including means responsive to relative movement between said carrier and said member resulting from arrest of the carrier electrode before it contacts the work to effect powered movement of said member in said one direction.

2. In a powered electric welder, in combination, a pair of relatively movable welding electrodes, a carrier pivotally movable in reverse directions to move one of said electrodes toward or away from the other electrode, a rectilinearly movable member having a lost motion driving connection with said carrier, and which upon movement in one direction effects movement of said carrier to separate said electrodes, power responsive means affording movement of said member in said one direction to a normal extreme position or in the opposite direction toward another extreme position, said carrier inherently tending to move its electrode toward said other electrode and insuring take-up of lost motion between it and said member upon movement of the latter from its normal extreme position toward its other extreme position until said carrier electrode contacts the work between said electrodes or is arrested before it contacts the work, and control means for said power responsive means including means responsive to relative movement between said carrier and said member resulting from arrest of the carrier electrode before it contacts the work to effect powered movement of said member in said one direction.

3. In a powered electric welder, in combination, a pair of relatively movable welding electrodes, a carrier pivotally movable in reverse directions to move one of said electrodes toward or away from the other electrode, a rectilinearly movable member having a lost motion driving connection with said carrier, and which upon movement in one direction effects movement of said carrier to separate said electrodes, power responsive means affording movement of said member in said one direction to a normal extreme position or in the opposite direction toward another extreme position, resilient means associated with said carrier and said member for maintaining take-up of lost motion therebetween upon movement of the latter from its normal extreme position toward its other extreme position until the carrier electrode contacts the work between said electrodes or is arrested before it contacts the work, and control means for said power responsive means including means responsive to relative movement between said carrier and said member resulting from arrest of the carrier electrode before it contacts the work to effect powered movement of said member in said one direction.

4. In a powered electric welder, in combination, a pair of relatively movable welding electrodes, a carrier pivotally movable in reverse directions to move one of said electrodes toward or away from the other electrode, a rectilinearly movable member having a lost motion driving connection with said carrier, and which upon movement in one direction effects movement of said carrier to separate said electrodes, power responsive means affording movement of said member in said one direction to a normal extreme position or in the opposite direction toward another extreme position, said carrier having bias maintaining take-up of lost motion between it and said member upon movement of the latter from its normal extreme position toward its other extreme position until the carrier electrode contacts the work between said electrodes or is arrested before it contacts the work, and control means for said power responsive means including in association with said member and said carrier cooperating electric switches which as a function of relative movement between said carrier and said member resulting from arrest of the carrier electrode before it contacts the work effect powered movement of said member in said one direction.

5. In a powered electric welder, in combination, a pair of relatively movable welding electrodes, a carrier pivotally movable in reverse directions to move one of said electrodes toward or away from the other electrode, a rectilinearly movable member having a lost motion driving connection with said carrier, and which upon movement in one direction effects movement of said carrier to separate said electrodes, power responsive means affording movement of said member in said one direction to a normal extreme position or in the opposite direction toward another extreme position, said carrier having bias maintaining take-up of lost motion between it and said member upon movement of the latter from its normal extreme position toward its other extreme position until the carrier electrode contacts the work between said electrodes or is arrested before it contacts the work, and control means for said power responsive means acting upon relative movement between said carrier and said member resulting from arrest of the carrier electrode before it contacts the work, to effect powered movement of said member in said one direction, said control means for causing it to so function comprising cooperating electric switches one of which is operable as an incident to relative movement between said carrier and said member and another of which is operable as a function of a predetermined distance travel of said member from its normal position.

6. In a powered electric welder, in combination, a pair of relatively movable welding electrodes, a carrier pivotally movable in reverse directions to move one of said electrodes toward or away from the other electrode, a rectilinearly movable member having a lost motion driving connection with said carrier, and which upon movement in one direction effects movement of said carrier to separate said electrodes, power responsive means affording movement of said member in said one direction to a normal extreme position or in the opposite direction toward another extreme position, said carrier having bias maintaining take-up of lost motion between it and said member upon movement of the latter from its normal extreme position toward its other extreme position until the carrier electrode contacts the work between said electrodes or is arrested before it contacts the work, and control means for said power responsive means comprising in series relation first and second single throw electric switches, said first switch being operable to complete a circuit upon relative movement between said carrier and said member when the latter is moved toward its other extreme position, said second switch being normally positioned to complete a circuit such that circuit closing operation of said first switch will cause said control means to effect powered movement of said member in said one direction, and said second switch being operable as an incident to predetermined distance travel of said member from its normal toward its other extreme position to render circuit closing operation of said first switch ineffective.

7. In a fluid powered electric welder, in combination, a pair of relatively movable welding electrodes, a carrier pivotally movable in reverse directions to move one of said electrodes toward or away from the other electrode, a rectilinearly movable member having a lost motion driving connection with said carrier, and which upon movement in one direction effects movement of said carrier to separate said electrodes, fluid power responsive means subject to manual control to selectively move said member in said one direction to a normal extreme position or in the opposite direction toward another extreme position at will, said carrier having bias maintaining take-up of lost motion between it and said member upon movement of the latter from its normal extreme position toward its other extreme position until the carrier electrode contacts the work between the electrodes or is arrested before it contacts the work, an electroresponsive relay which when energized effects powered movement of said member in said one direction, and first and second single throw electric switches in series relation, said first switch being operable to complete a circuit upon relative movement between said carrier and said member when the latter is moved toward said other extreme position, said second switch being normally positioned to complete a circuit such that circuit closing operation of said first switch will effect energization of said relay, and said second switch being operable as an incident to predetermined distance travel of said member from its normal toward its other extreme position to render circuit closing operation of said first switch ineffective to energize said relay.

JEROME B. WELCH.

No references cited.